UNITED STATES PATENT OFFICE.

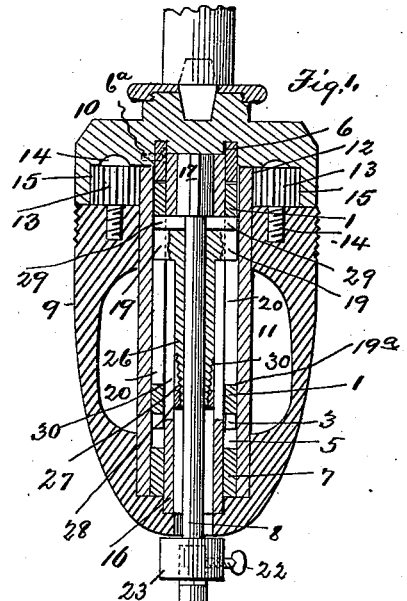

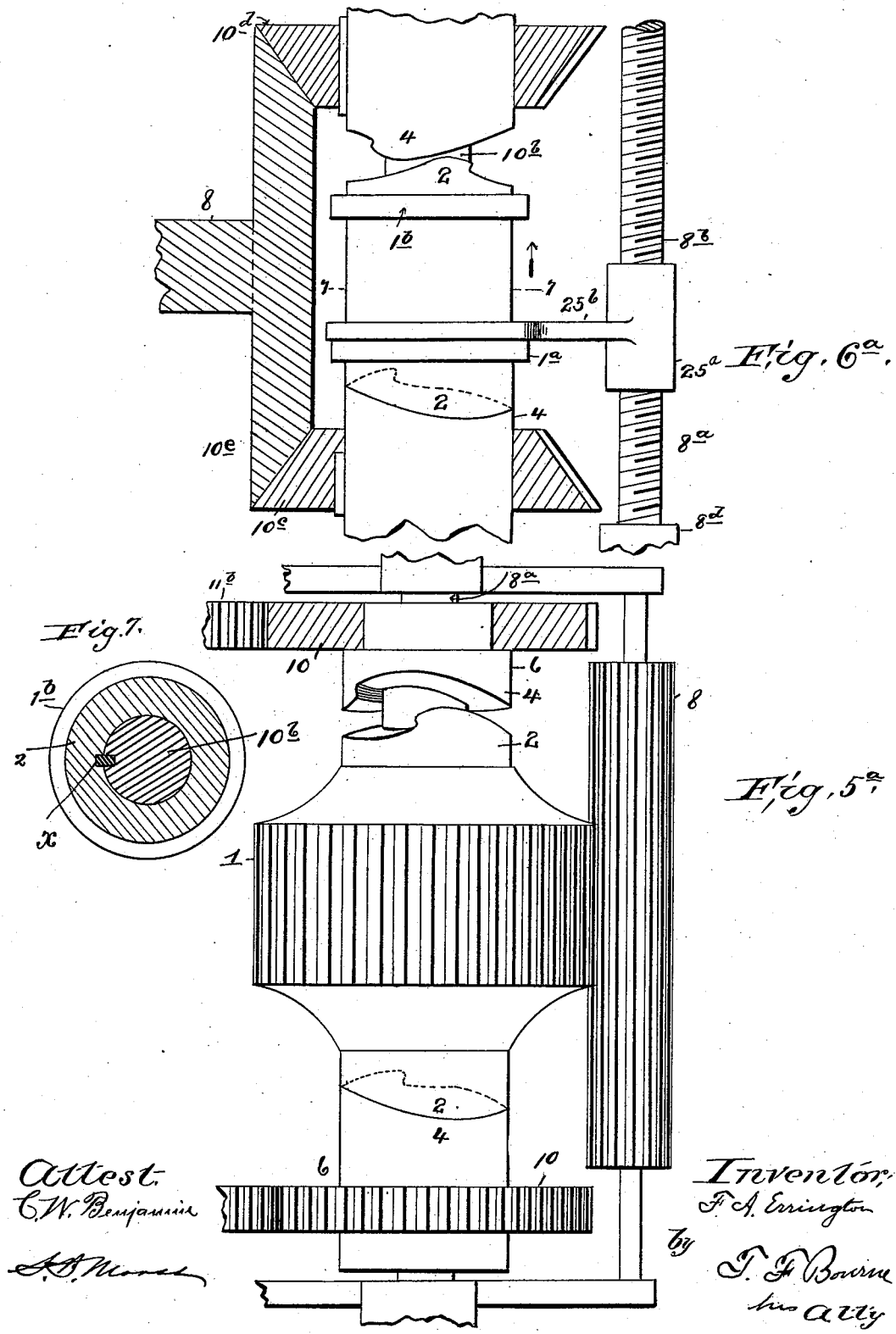

FRANKLIN A. ERRINGTON, OF EDGEWATER, NEW YORK.

CLUTCH DEVICE.

SPECIFICATION forming part of Letters Patent No. 558,372, dated April 14, 1896.

Application filed August 25, 1893. Serial No. 484,023. (No model.)

*To all whom it may concern:*

Be it known that I, FRANKLIN ALFRED ERRINGTON, a citizen of the United States, residing in the village of Edgewater, Richmond county, New York, have invented certain new and useful Improvements in Clutch Devices, of which the following is a specification.

My invention relates, broadly, to means for automatically reversing the motion of a moving part or changing its degree of velocity, or both, and more particularly to the discovery of a new principle of construction, the embodiment of which in a clutch mechanism consisting of three clutch-formations or members whose axes are located in line, the rotation of whose driving member or members is uninterrupted and constant in direction, wherein the ratio of certain lengths of the intermediate clutch-formation or member to certain distances between the corresponding parts of the two end clutch-formations or members will enable the members at one end upon being unclutched from rotary engagement and when rotating independently to positively push or draw by the coaction of their opposing surfaces the clutch members at the other end into rotary engagement, and to the means for effecting said disengagement.

My invention consists in the novel principle of construction and the combination of parts set forth in this specification, and illustrated in the drawings forming part hereof, and then pointed out in the claims.

In a clutch mechanism embodying my invention certain of the clutch-formations or members are provided with driving-faces performing two distinct functions, the faces that enable one clutch-formation or member to turn the other being called "rotary" driving-faces, and the faces that enable one member to push or draw the other longitudinally "longitudinal" driving-faces; and the construction of the parts may be varied from that shown, but in every case the principle of construction must be mine to secure the functional result in question.

Reference is to be had to the accompanying drawings, forming part hereof, wherein—

Figure 1 is a vertical cross-section of a single-acting mechanism to which my invention is applied. Fig. 2 is a partly-sectional side elevation of part of the same, showing the clutch members in position for driving the intermediate clutch member in one direction. Fig. 3 is a corresponding view showing the clutch members in position to drive the intermediate member in the reverse direction. Fig. 4 is a developed plan of the clutches, illustrating them in detail at or about the point of disengagement of the rotary driving-faces of two of the clutch members and showing, first, that the rotary driving-faces of the other end clutch member will not become engaged with the rotary driving-faces of the intermediate member until after the rotary driving-faces of the first-mentioned clutch-formations or members have been fully disengaged, and, second, that while the extreme length of said intermediate clutch-formation or member is greater than the shortest distance between the inner faces or opposing surfaces of the two end clutch-formations or members, yet it does not interrupt their independent rotation. Figs. 5 and 6 are cross sectional views of double-acting mechanisms to which my invention is applied. Fig. 5$^a$ is a similar view corresponding to Fig. 5. Fig. 6$^a$ is a similar view corresponding to Fig. 6, and Fig 7 is a cross-section on the line 7 7 in Fig. 6$^a$.

A clutch mechanism made in accordance with my principle of construction must invariably embody the following general formula, although variations may be made within these limits: First, the length of the intermediate clutch-formation or member between the outer extremities of the rotary driving-faces at its opposite ends must be less than the shortest distance between the outer extremities of the rotary driving-faces of the two end clutch-formations or members, to enable the intermediate clutch-formation or member to be disconnected from rotary engagement with one of the end clutch-formations or members before having rotary engagement with the other thereof, and, second, the extreme length of the intermediate clutch-formation or member must be greater than the shortest distance between the opposing surfaces of the said two end clutch-formations or members to render said intermediate clutch-formation or member too long to remain inactive between the opposing surfaces of said end clutch-formations or members.

The tendency of the parts so constructed to jam together is overcome by their form or elasticity, some of which methods are illustrated in the drawings, and in this connection attention is called to the advantages of a curved surface or surfaces (see Fig. 4) where the outer extremity or "point of disengagement" of the rotary driving-face merges into a longitudinal driving-face sloping outward longitudinally beyond and backward from said outer extremity of its respective rotary driving-face, thereby securing the second ratio or condition of the formula of my principle of construction.

It will be seen that the clutch members remain in rotary engagement until their rotary driving-faces are disengaged by some means, and that upon the disengagement of said rotary driving-faces the independent rotation of the disengaged clutch-formations causes the corresponding set of opposing surfaces having a longitudinal driving face or faces to push or draw the opposite set of rotary driving-faces into rotary engagement. This disengagement of the rotary driving-faces may be accomplished by hand or automatically by various means, some of which I have shown in the drawings. I, however, preferably employ a stop-piece or projection carried by the spindle upon which the clutch members may be located, one or more of said clutch members having longitudinal movement thereon and one of said clutch members being connected to rotate therewith, said stop-piece being so arranged that at the desired time it will engage one of said longitudinally-movable clutch members and stop either its longitudinal movement upon said spindle or the independent movement of said spindle through said longitudinally-movable clutch-formation or member, and thereby cause the disengagement of the rotary driving-faces, as hereinafter explained. One feature of this arrangement is the fact that the stop-piece, although carried by said spindle, is enabled to directly engage the intermediate clutch member for the purpose above cited, which is an important simplification for the purpose.

In describing the application of my invention to the devices shown in the drawings I designate such a clutch mechanism as shown in Figs. 1, 2, 3, and 4 as "single-acting," in that the automatic coaction of the parts only secures one automatic shift of the clutch members and requires only one set of longitudinal driving-faces, after which the members can only be restored to the position shown in Fig. 2 by hand or other external means, whereas in Figs. 5 and 6 (and their enlarged views 5ª, 6ª, and 7) the clutch members are provided with two sets of longitudinal driving-faces and are "double-acting," in that the members automatically engage first at one end and then at the other, and so on back and forth at desired intervals.

In Fig. 1 the internal gear-wheel 10, carrying clutch-sleeve 6, is driven constantly in one direction, and the gear-wheel 12 and its hub 11, carrying the clutch-sleeve 7, is driven constantly at an increased velocity in the opposite direction through the medium of the intermediate pinions 13, carried by the supporting-frame 9, which may be of suitable construction and longitudinally movable, forming part of a tapping attachment with the wheel 10, connected with the longitudinally-movable spindle of a drill-press.

The intermediate clutch-sleeve 1, constructed in accordance with my invention, is located between and in line with the other first-mentioned clutch sleeves, formations, or members 6 7. The spindle 8 passes through the common axes of said clutch members, the intermediate clutch-sleeve 1 being connected to rotate with the spindle 8, and have free longitudinal movement thereon by the lugs 19 and 29 on said spindle passing through the slot 20 in said sleeve 1, the slot 20 being of a length proportionate to the desired independent travel longitudinally of spindle 8, and one or both of said stop-pieces or lugs 19 and 29 being adjustable on said spindle to regulate the disengagement of the rotary driving-faces of said clutch members when desired.

To reduce torsional friction on the parts I may interpose between sleeve 1 and spindle 8 a tube or auxiliary spindle 16, although said tube may be dispensed with, if desired; also, when tube 16 is used the spindle 8 may have a feather 17, meshing with a corresponding groove in said tube 16, and said tube and sleeve 1 may be similarly connected together, the lugs or stop-pieces 19 and 29 passing through a slot 30 in tube 16, similar to slot 20 in sleeve 1. As in this device the disengagement of the rotary driving-faces of the clutch members is primarily caused by the longitudinal movement of the spindle 8 through its stop-pieces 19 or 29 engaging with either end of the slot 20 of sleeve 1, I have shown a nut 25 to receive a threaded end of said spindle or part 21, connected to the end of said spindle 8 by a socket and screw 23 and 22, whereby the rotation of said spindle 8 in one direction by the sleeve 1 engaging the sleeve 6 advances the part or tap 21 within the nut or work 25, and on the rotation of spindle 8 in the opposite direction by the sleeve 1 engaging the sleeve 7 the part or tap 21 retreats from said nut or work 25, in both cases, of course, carrying the spindle 8 longitudinally with it, and through the medium of stop-pieces 19 and 29 disengaging first one set of rotary driving-faces and then the other.

Upon disengaging the rotary driving-faces $a\ b$, that enable the clutch-formation or member 6 to turn the clutch-formation 1, the continued rotation of the clutch-formation 6 causes the longitudinal driving-faces $d\ d$, sloping outward longitudinally beyond and backward from their respective rotary driving-faces, to pass over each other and thereby push the intermediate longitudinally-movable clutch-formation or sleeve 1 longitudinally upon spindle 8 the length over all of said intermediate clutch member 1 being such that the rotary driving-faces $f$ at the opposite end of said intermediate member will thereby become engaged with the corresponding rotary driving-faces $f$ of clutch member 7, and in the construction shown while the opposing surfaces $d\ d$ of clutch-formations 6 1 pass freely over or past each other, yet they pass each other so closely as to enable the longitudinal driving-faces $d\ d$ to force the rotary driving-faces $f\ f$ into full rotary engagement. (See Fig. 3.)

It is particularly desirable in a double-acting device, such as Figs. 5 and 6, that the longitudinal driving-faces at one end should fully engage the rotary driving-faces at the opposite end of the intermediate clutch-formation and yet allow the longitudinal driving-faces to freely pass each other after having caused said full engagement of said rotary driving-faces; but the undercutting of the rotary driving-faces, as shown at $f\ f$, or other equivalent means may aid in completing the engagement of said rotary driving-faces whose engagement is primarily caused by said longitudinal driving-faces. The opposing surfaces $h\ g$ of the clutch-formations or members 1 7 are sloped inward and backward from the outer extremities of the rotary driving-faces $f\ f$ to facilitate their ready connection and avoid jamming. It will also be noticed that the rotary driving-faces $a\ b$ of the clutch-formations or members 6 1 are undercut in the form of an ogee to afford easy disengagement and yet enable said faces to remain in contact during the independent longitudinal movement of the spindle 8 and its stop-pieces, as provided for by the slot 20 in sleeve 1. This provides space between the top of said slot and the top of said stop-pieces before the sleeve 1 moves longitudinally under the automatic coaction of said longitudinal driving-faces to avoid jamming.

The disengagement of the rotary driving-faces is not dependent upon the longitudinal movement of the spindle upon which they are located, but may be otherwise caused; and the construction of the parts may vary considerably, but must embody my principle of construction to secure my simple and direct coaction, some of which variations I have illustrated in Figs. 5 and 6 and their enlarged views, in which the clutch mechanism is rendered double acting by the opposing surfaces of one or both of the adjacent clutch-formations or members at each end of the intermediate clutch-formation or member being provided with a longitudinal driving face or faces.

In Fig. 5 I have shown a stationary shaft or spindle $8^a$, provided with screw-threads $8^b$, that mesh with internal threads $8^c$ within a nut or stop $25^a$, said nut or stop-piece being placed within a bore 35 in sleeve 1. This sleeve or shifter 1 has external teeth 37, that mesh with teeth 38 on a spindle 8, that may be suitably supported or journaled, and by the action of said nut $25^a$ and sleeve 1 the spindle 8 may be turned alternately in opposite directions. The nut or stop-piece $25^a$ is arranged to have independent longitudinal movement within sleeve 1, and for this purpose the latter is provided with one or more grooves 39 to receive one or more projections 40 on nut $25^a$, so that the latter will be turned on the spindle $8^a$ by and with the sleeve 1, the threads $8^b$ and $8^c$ then acting to move the nut or stop-piece $25^a$ to and fro along said spindle $8^a$. Elasticity of nut $25^a$ will prevent jamming. The sleeve 1 being provided at its opposite ends with teeth 2, adapted to engage teeth 4, carried by the end clutch members 6 7, the clutches are double acting. The spindle $10^b$ being driven in one direction and the parts being in the position shown in Fig. $5^a$, the wheel 10, connected with said shaft $10^b$, its clutch-formation 6, and the sleeve 1 in rotary engagement therewith, will all be turned in the same direction, and the other wheel 10 at the opposite end of said mechanism and carrying clutch-formation 6, will be turned in the opposite direction through the intermediate gearing shown, so that as the sleeve 1 is shifted automatically from one engagement to the other of its rotary driving-faces, the direction of rotation of the spindle 8 is reversed automatically thereby, the direction of rotation of the driving parts being always constant.

In Fig. 6, instead of having the nut or stop-piece $25^a$ within the clutch-formation or sleeve 1, it may be carried separately therefrom—say by the threaded spindle $8^a$—which may be carried in separate bearings $8^d$, and rotated by spur gear-wheels 10 and $11^b$. In this case the spindle $10^b$ passes through the device, and sleeve 1 is mounted to slide thereon and to be turned thereby—say by the well-known feather and groove X—as shown in Fig. 7. On the shaft $10^b$ are loosely-mounted bevel-wheels $10^c$ and $10^d$, carrying clutch-formations or teeth 4 4 for engagement with clutch-formations 2 2 at opposite ends of sleeve 1. The wheels 10 and $10^d$ are turned together by one set of teeth 2 4, and the wheel $10^c$ by the other set of teeth 2 4, according to the position of the intermediate clutch-formation or sleeve 1. The wheels $10^c$ and $10^d$ mesh with an intermediate bevel-wheel $10^e$ on spindle 8, by which means the spindle 8 will be turned in opposite directions, according to which wheel $10^c$ or $10^d$ is being turned by sleeve 1. It is obvious that if spindle 8 were primarily driven the spindle $10^b$ could be similarly driven in opposite directions according to the movements of sleeve 1, or wheels $10^c$ and $10^d$ might be otherwise driven and transmit motion to shaft $10^b$ through sleeve 1.

For the purpose of shifting sleeve 1 by disconnecting it from rotary engagement with either wheel $10^c$ or $10^d$, said sleeve 1 is connected to a nut or stop-piece $25^a$ by an arm 25$^b$ (which may be sufficiently flexible to prevent jamming of the teeth) in such manner that sleeve 1 can rotate and have longitudinal movement within said arm. It is here noticed that in all cases sleeve 1 must have free longitudinal movement after the disengagement of the rotary driving-faces, to prevent jamming on the stop-piece during the coaction of the longitudinal driving-faces. To allow arm 25$^b$ to have free longitudinal movement independent of sleeve 1, said sleeve 1 is provided with flanges 1$^a$ 1$^b$, as shown, so that when arm 25$^b$ has moved a certain distance freely it will engage one of said flanges, and thus move said sleeve 1 out of one rotary engagement to permit the longitudinal driving-faces to cause reëngagement at the other end. To prevent jamming I have shown a spring A interposed between wheel 10$^c$ and a bearing or abutment B, said spring being shown surrounding the part or sleeve 6 that carries said clutch-formation 4. To reduce wear on said spring I interpose washers $a'$ $b'$ between said spring and the wheel 10$^c$ and abutment B. This spring A thus arranged will hold the clutch-formation 4 of the sleeve 6 in operative position and still allow independent longitudinal movement. The other end clutch-formation could be likewise arranged, if desired. In Figs. 6 and 6$^a$ the teeth at opposite ends of the sleeve 1 are set in the same or in opposite directions, respectively, as sleeve 1 drives wheels 10$^d$ and 10$^c$ or is driven by them, the teeth on said wheels being also arranged in either direction, respectively, to receive from or impart motion to said sleeve.

The novelty of my principle of construction can hardly be more clearly illustrated than by reference to the mass of complicated and expensive mechanisms by which others have accomplished the object secured by my simple and direct means. It will be seen that while the two ratios of lengths to distances herein mentioned embody the fundamental principle by which the functional results are obtained, yet the longitudinal driving-faces and rotary driving-faces must be in relative proportion to each other, although this is readily accomplished when once acquainted with the fact that an intermediate clutch-formation or member embodying these ratios is operative, under the conditions and for the purpose specified.

Having now described my invention, what I claim is—

1. The combination of three rotative clutch-formations or members located in line and having rotary driving-faces in their opposing surfaces, certain of said clutch-formations or members having a longitudinal driving face or faces sloping outward longitudinally beyond and backward from the outer extremity of said rotary driving face or faces, certain of said clutch-formations or members having longitudinal movement adapted to engage to rotate one another, means to disengage said rotary driving-faces, the length of the intermediate clutch-formation or member between the outer extremities of the rotary driving-faces at its opposite ends being less than the shortest distance between the outer extremities of the rotary driving-faces of the two end clutch-formations or members, and the extreme length of said intermediate clutch-formation or member being greater than the shortest distance between the opposing surfaces of said end clutch-formations or members substantially as described.

2. The combination of a spindle, two rotative clutch-formations or members located on said spindle, one of said clutch-formations or members being longitudinally movable on said spindle, said clutch-formations or members having rotary driving-faces in their opposing surfaces to turn one by the other, and a stop-piece carried by said spindle and adapted to engage longitudinally with said longitudinally-movable clutch-formation, to disengage said rotary driving-faces, substantially as described.

3. The combination of a spindle, two rotative clutch-formations or members located on said spindle, one of said clutch-formations or members being movable longitudinally on said spindle, said clutch-formations or members having rotary driving-faces in their opposing surfaces to turn one by the other, one of said clutch-formations or members having a longitudinal driving-face sloping outward longitudinally beyond and backward from the outer extremity of said rotary driving-face, and a stop-piece carried by said spindle and adapted to engage longitudinally with said longitudinally-movable clutch-formation or member to disengage said rotary driving-faces, substantially as described.

4. The combination of a spindle, three rotative clutch-formations or members located on said spindle and having rotary driving-faces in their opposing surfaces, the intermediate clutch-formation or member being connected to rotate with said spindle and have longitudinal movement independent thereof to secure rotary engagement alternately with the end clutch-formations or members, certain of said clutch-formations or members having a longitudinal driving face or faces sloping outward longitudinally beyond and backward from the outer extremity of said rotary driving face or faces, a stop-piece carried by said spindle and adapted to engage longitudinally with said intermediate clutch-formation or member to disengage said rotary driving-faces, the length of said intermediate clutch-formation or member between the outer extremities of the rotary driving-faces at its opposite ends being less than the shortest distance between the outer extremities of the rotary driving-faces of the two end clutch-formations or members, and the extreme length of said intermediate clutch-formation or member being greater than the shortest distance between the opposing surfaces of said end clutch-formations or members, substantially as described.

5. The combination of a spindle, a stop-piece carried thereby, two rotative clutch-formations or members located on said spindle and having rotary driving-faces in their opposing surfaces to turn one another, one of said clutch-formations or members being longitudinally movable on said spindle and having a slot extending through part of its length said stop-piece being adapted to have longitudinal movement within said slot to engage its ends to engage or disengage said rotary driving-faces, substantially as described.

F. A. ERRINGTON.

Witnesses:
  T. F. BOURNE,
  E. M. FORT.